US009554505B2

(12) United States Patent
Sivinski et al.

(10) Patent No.: US 9,554,505 B2
(45) Date of Patent: Jan. 31, 2017

(54) PNEUMATIC SYSTEM AND METHOD FOR A FOLDING TOOLBAR AND SEED PLANTER ASSEMBLY

(71) Applicant: Harvest International, Inc., Storm Lake, IA (US)

(72) Inventors: Jeffrey Alan Sivinski, Cherokee, IA (US); Byron J. Friesen, Storm Lake, IA (US); Garry D. Friesen, Storm Lake, IA (US)

(73) Assignee: Harvest International, Inc., Storm Lake, IA (US)

( * ) Notice: Subject to any disclaimer, the term of this patent is extended or adjusted under 35 U.S.C. 154(b) by 96 days.

(21) Appl. No.: 14/466,254

(22) Filed: Aug. 22, 2014

(65) Prior Publication Data

US 2016/0050844 A1    Feb. 25, 2016

(51) Int. Cl.
*A01C 7/20* (2006.01)
*A01C 7/08* (2006.01)
*A01B 73/04* (2006.01)
*A01B 73/02* (2006.01)

(52) U.S. Cl.
CPC ............. *A01C 7/208* (2013.01); *A01B 73/04* (2013.01); *A01C 7/082* (2013.01); *A01B 73/02* (2013.01)

(58) Field of Classification Search
CPC ......... A01B 73/04; A01B 73/02; A01B 73/00; A01C 7/208; A01C 7/20; A01C 7/00; A01C 7/082; A01C 7/081; A01C 7/08

See application file for complete search history.

(56) References Cited

U.S. PATENT DOCUMENTS

| | | | |
|---|---|---|---|
| 5,552,647 A * | 9/1996 | Tinkham | H01H 9/16 200/17 R |
| 6,308,646 B1 * | 10/2001 | Luxon | A01C 7/042 111/175 |
| 6,516,733 B1 | 2/2003 | Sauder et al. | |
| 6,725,788 B2 | 4/2004 | McCartney et al. | |
| 7,237,495 B2 | 7/2007 | Harnetiaux | |
| 7,665,409 B2 | 2/2010 | Johnson | |
| 7,823,807 B1 | 11/2010 | Bauer | |
| 2009/0007828 A1 * | 1/2009 | Johnson | A01C 7/082 111/79 |

* cited by examiner

*Primary Examiner* — Christopher J Novosad
(74) *Attorney, Agent, or Firm* — McKee, Voorhees & Sease, PLC

(57) ABSTRACT

A pneumatic manifold is provided for a folding toolbar for use with seed planters having pneumatic seed metering devices. The manifold is formed within the tubular center section and opposite folding wings of the toolbar. A flexible coupler is provided at each wing hinge juncture to provide air flow through the toolbar wings and the center section, while allowing the toolbar to fold and unfold between the transport and field positions.

18 Claims, 5 Drawing Sheets

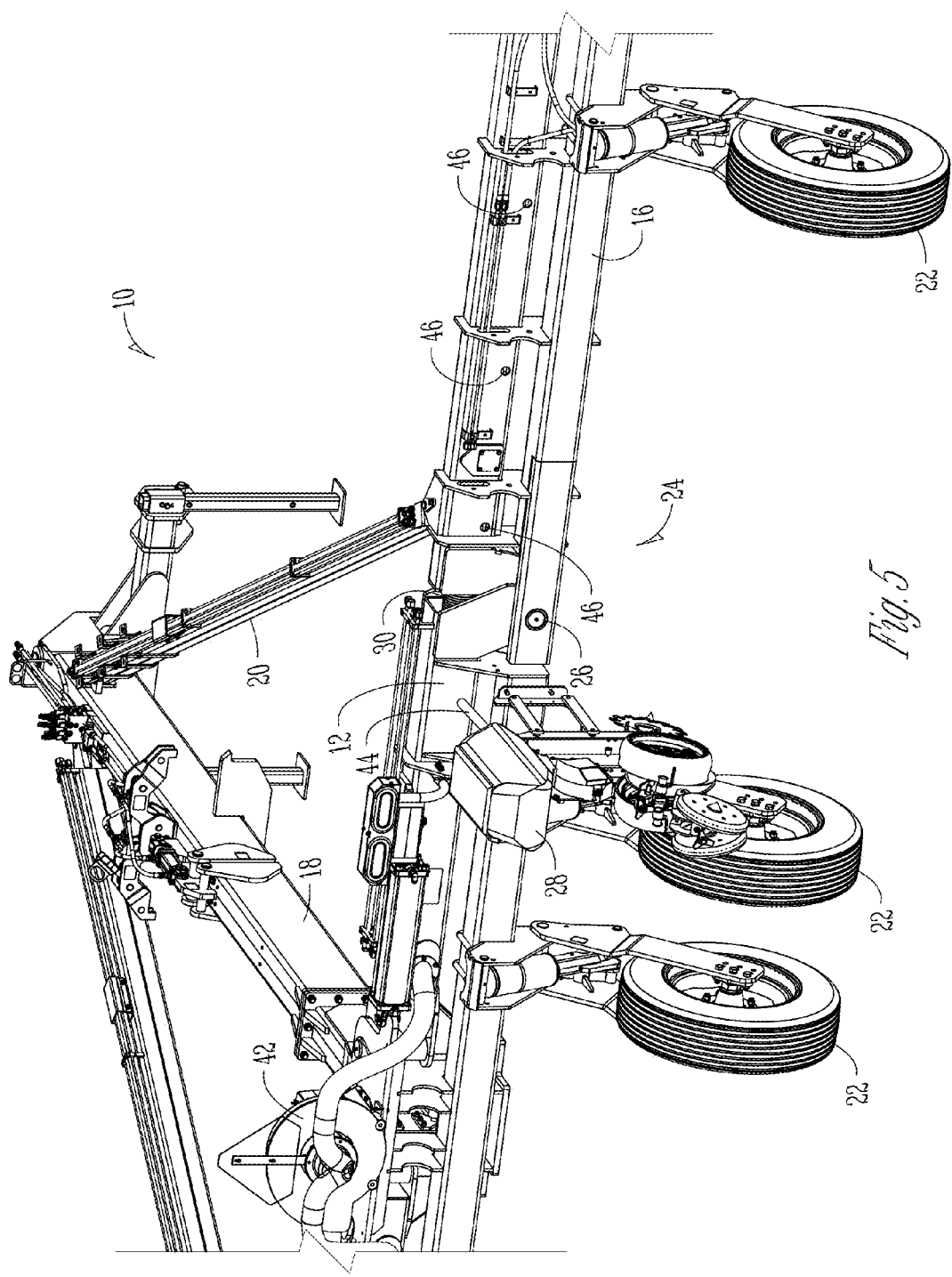

PNEUMATIC SYSTEM AND METHOD FOR A FOLDING TOOLBAR AND SEED PLANTER ASSEMBLY

BACKGROUND OF THE INVENTION

Agricultural toolbars having a plurality of row crop planters mounted thereon are well-known in the agricultural industry. The planters generally use mechanical or pneumatic seed metering devices. Pneumatic metering can use either positive or negative air pressure. Conventional folding toolbars which have outer tubular wing sections which pivot between a folded transport position and an unfolded use position typically have external pneumatic hoses or airlines extending from the air pump to the outer wing sections. Separate pneumatic lines then extend from the toolbar center section and wing sections to the metering device of each planter. However, farmers do not like clutter, such as external hoses and air lines fixed to their toolbars, for numerous reasons, including risk of damage, normal wear and tear, and appearance.

It is also known in a non-folding, fixed toolbar to use the hollow toolbar tube as an air manifold, such as disclosed in U.S. Pat. No. 6,725,788. However, such an internal manifold is not possible with folding toolbars due to the open hinge joint between the center tube section and outer wing sections.

Therefore, a primary objective of the present invention is the provision of an improved pneumatic system for a folding toolbar and seed planter assembly.

Another objective of the present invention is the provision of a pneumatic system which forms an internal manifold in the center section and wing sections of a folding toolbar for the pneumatic seed metering devices of planters mounted on the toolbar.

Another objective of the present invention is the provision of an improved method of dispensing seeds from seed planters using a pneumatic manifold on a folding toolbar.

A further objective of the present invention is the provision of an improved folding toolbar and seed planter assembly free from pneumatic hoses between the air pump and the toolbar wings.

Another objective of the present invention is the provision of a folding toolbar having bellows between the center toolbar section and the outer wing sections to form an air manifold for seed metering.

Yet another objective of the present invention is the provision of an improved pneumatic system for a folding toolbar and seed planter assembly which is economical to manufacture, simple to operate, and durable in use.

These and other objectives will become apparent from the following description of the invention.

SUMMARY OF THE INVENTION

A pneumatic system and method is provided for folding toolbars having seed planters with pneumatic metering devices for dispensing seeds. The system utilizes the tubular center toolbar section and tubular outer wing sections as an air manifold for both negative and positive air pressure seed metering devices. An air pump or fan is mounted on the toolbar. A flexible bellows or a coupler is provided at the pivotal juncture of the center section and each wing section to provide air flow between the sections. Individual airlines extend from the center and wing sections to the metering device on each planter.

The method of the present invention creates the air manifold through the toolbar wing sections and center section to operate the pneumatic metering systems of the seed planters. The toolbar is free from pneumatic hoses or lines extending between toolbar sections and from the air pump to the remote toolbar sections.

BRIEF DESCRIPTION OF THE DRAWINGS

FIG. 5 is another perspective view of the toolbar with one row planter mounted thereon, though it is understood that normally the toolbar has a series of planters for planting seeds.

DETAILED DESCRIPTION OF THE PREFERRED EMBODIMENTS

Figure 1:
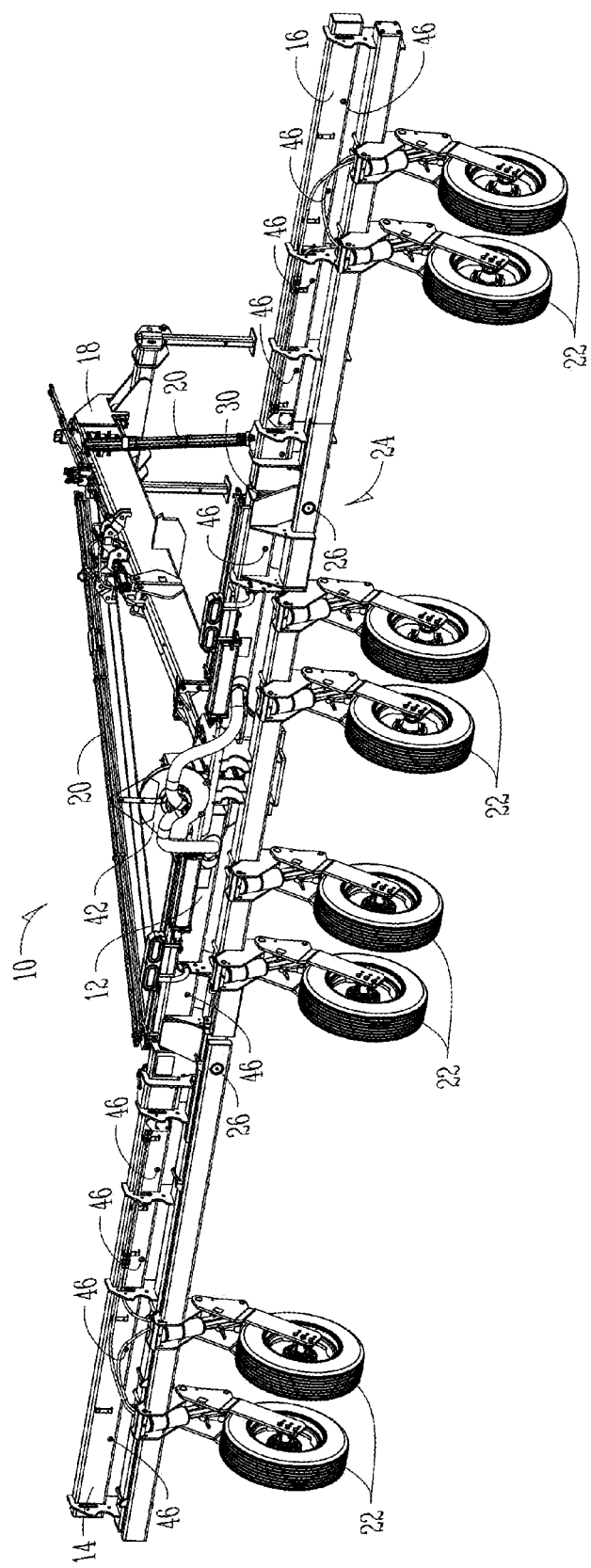
FIG. 1 is a perspective view of an agricultural folding toolbar having the pneumatic manifold of the present invention, with the row planters removed for clarity.
Figure 2:
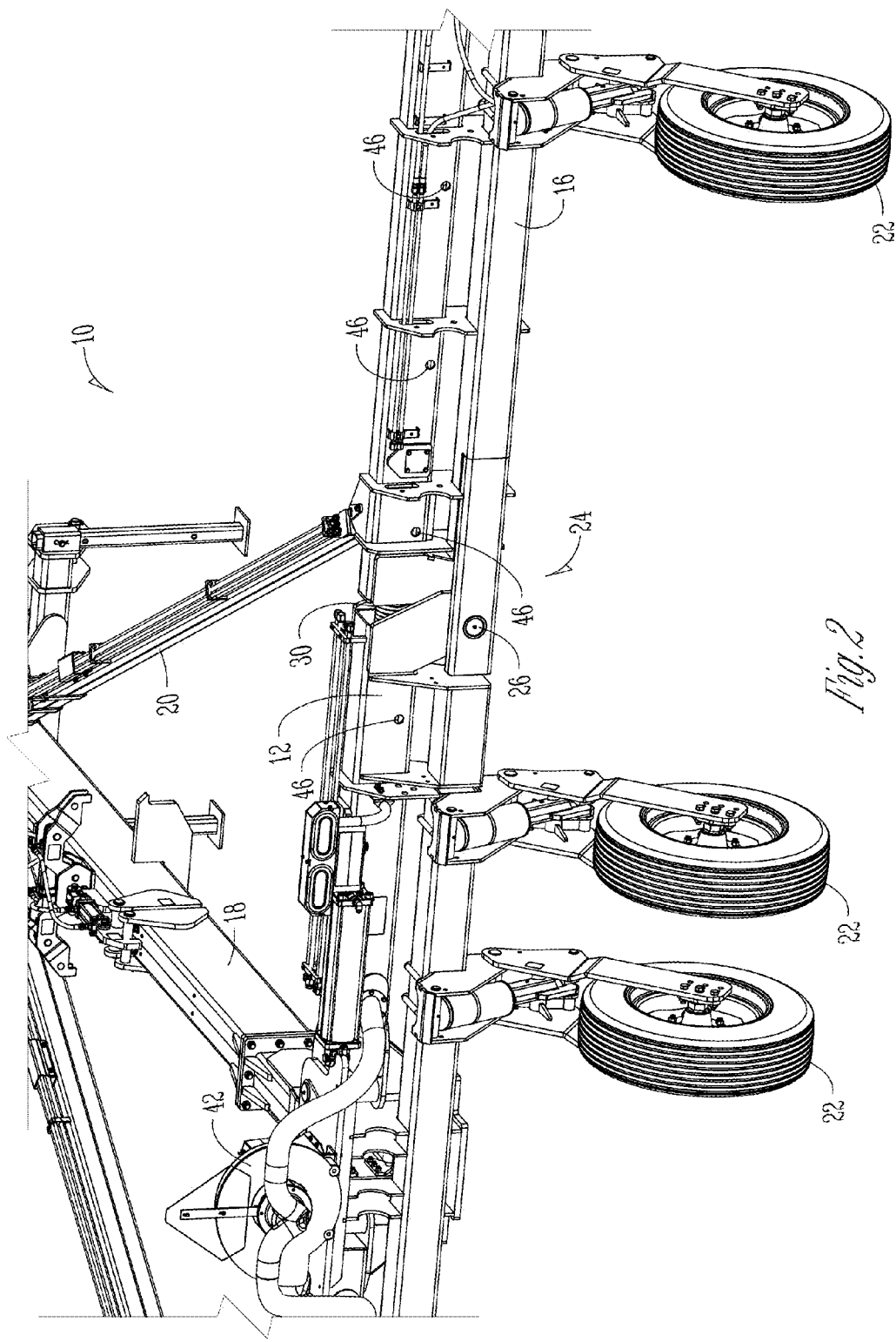
FIG. 2 is an enlarged perspective view of the right hinge juncture of the center tube or section and right wing of the toolbar.
Figure 3:
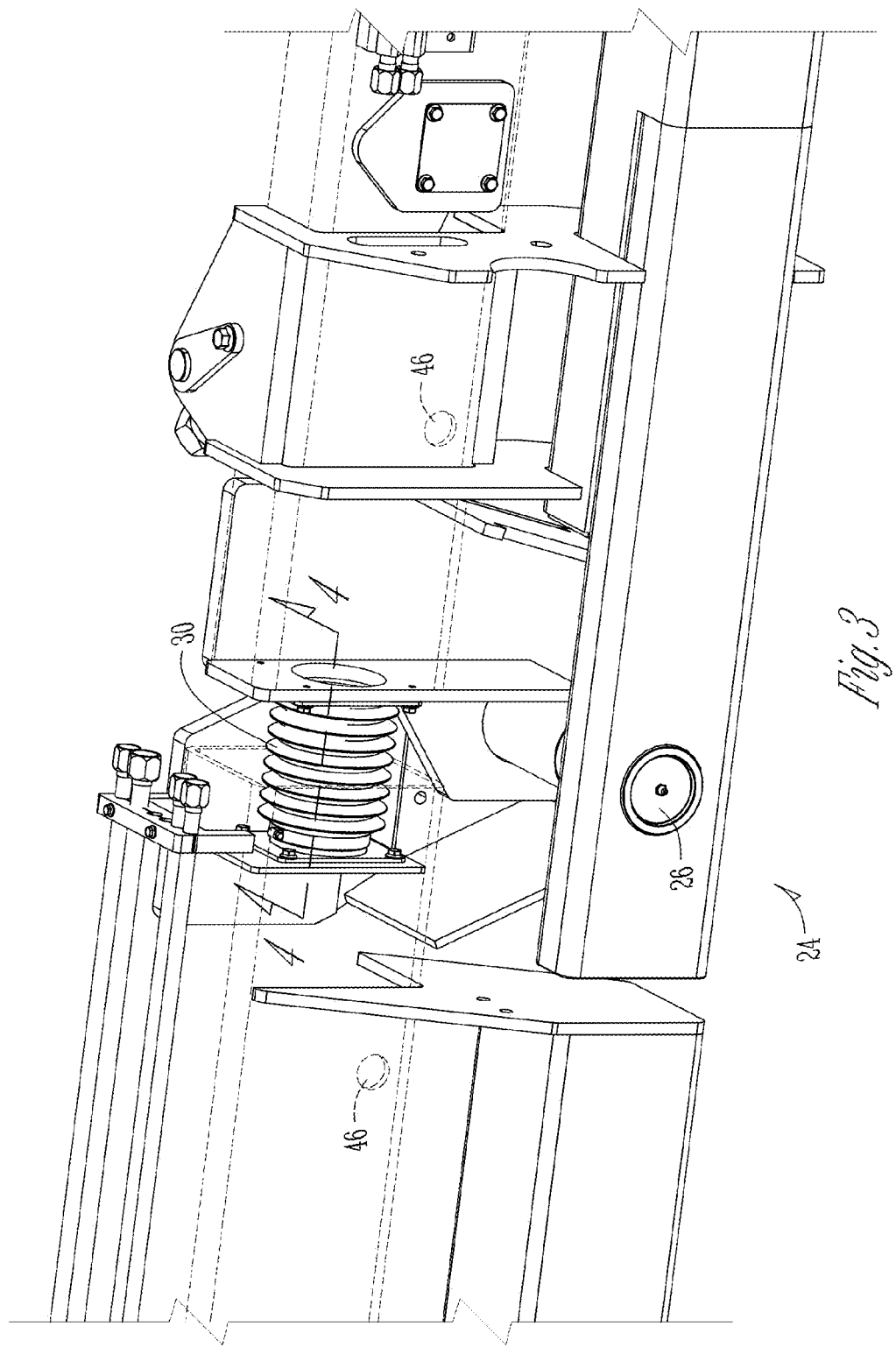
FIG. 3 is a perspective view showing the pneumatic manifold bellows for the right wing of the toolbar, with some structural components removed for clarity.

A folding toolbar 10 generally includes a tubular center section 12, a tubular left wing 14, and a tubular right wing 16. A tongue 18 extends forwardly from the center section, with telescoping support arms 20 extending between the tongue 18 and the wings 14, 16. The toolbar 10 is supported by wheels 22.

The left and right wings 14, 16 are pivotally connected to the left and rights ends of the center section 12 for movement between a folded transport position (not shown) and an unfolded field position (as shown in FIG. 1). The folding and unfolding of the wings 14, 16 is accomplished with hydraulics, as is known in the art. The hinge junctures 24 between the wings 14, 16 and the center section 12 also includes a horizontal pivot axis 26 to allow the wings to rise and fall relative to the center section 12 when traversing over uneven ground. Various equipment can be mounted on the toolbar 10 for use in the fields. At planting time, seed planters 28 can be mounted on the toolbar 10. The planters 28 include a pneumatic seed metering device, of either the positive or negative air pressure types. Only one planter 28 is shown in FIG. 5, for simplicity, though it is understood that the toolbar 10 will have a series of planters along the center section 12 and the wing sections 14, 16.

Figure 4:
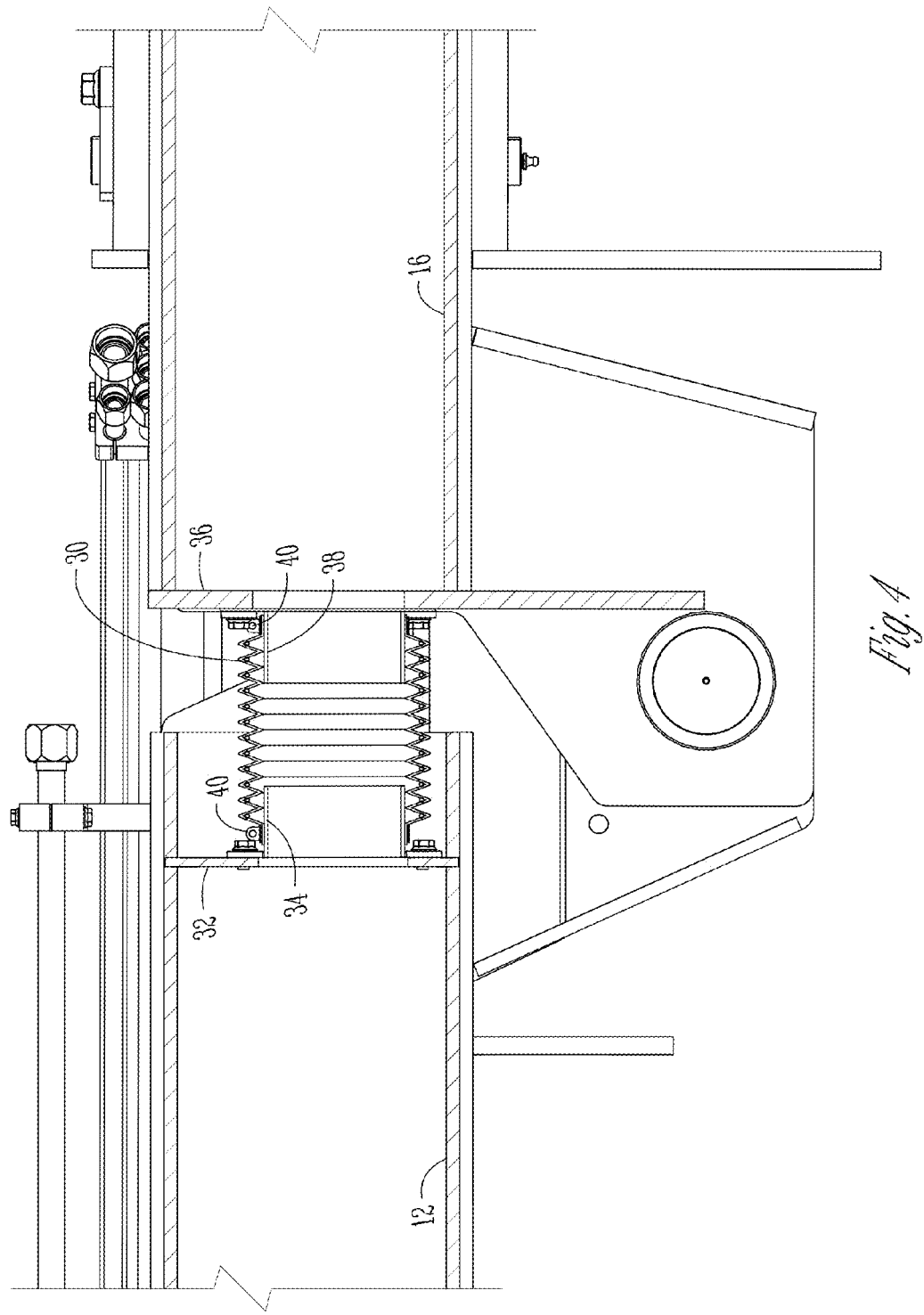
FIG. 4 is a sectional view of the right bellows of the pneumatic manifold, taken along lines 4-4 of FIG. 3.

The present invention is directed towards a pneumatic manifold system for the toolbar 10 and planters 28. The manifold is formed by the hollow center section 12 and hollow wings 14, 16. A flexible coupler 30, such as a bellows, is mounted at the hinge juncture 24 of each wing, 14, 16. As seen in FIG. 4, a plate 32 with a cylindrical collar 34 is fixed inside the right end of the center section 12. The inner or left end of the right wing 16 also includes a plate 36 with a cylindrical collar 38. The bellows 30 is mounted on the collars 34, 38 in any convenient manner, such as by hose clamps 40. Thus, the bellows 30 provides an air passage between the interior of the center section 12 and the right wing 16. The outer end of the right wing 16 is closed. A similar bellows is provided at the hinge juncture 24 of the left wing 14, with a mirror image structure from the right bellows 30 shown in FIG. 4.

An air pump or fan 42 is mounted on the center section 12 and provides either positive or negative air pressure to the inside of the center section 12. Thus, air flows through the manifold created by the tubular center section 12 and the tubular left and right wings 14, 16 and left and right bellows 30. Alternatively, the pump or fan 42 can be mounted on either wing section 14, 16, for air flow through all the toolbar sections. The resiliency or flexibility of the bellows 30 allow the wings 14, 16 to fold and unfold to and from the transport position, and to float vertically about the horizontal axis 26.

The planters 28 each include an airline or hose 44 extending from the pneumatic seed metering device (not shown) and are attached to the toolbar 10. The center section 12 and the wings 14, 16 include holes 46 to which the planter airlines 44 are attached to provide air flow between the toolbar manifold and the planter metering devices. If the pump 42 generates positive air pressure, air flows out of the manifold to the seed metering devices. If the pump 42 generates a vacuum, air is pulled into the manifold from the seed metering devices.

With the pneumatic manifold of the present invention, the toolbar is free from exterior mounted lines extending from the pump 42 to the wings 14, 16. Also, the pneumatic manifold eliminates air hoses extending through the center section 12 and wings 14, 16. Thus, the pneumatic manifold of the present invention provides a simpler system which is less costly to manufacture and easier to maintain, as compared to prior art pneumatic seed metering systems for folding toolbars.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. In combination, an improved folding toolbar and a plurality of seed planters, the toolbar having:
    a frame including a center tube and opposite left and right wing tubes pivotally attached to the center tube for movement between a folded transport position and an unfolded field position;
    the improvement comprising:
    left and right flexible bellows each having opposite ends so as to extend between the center tube and the left and right wing tubes, respectively, such that that left and right wing tubes move between the transport and field positions without decoupling the bellows from the left and right wing tubes and the center tube;
    a plurality of hoses each extending between one of the wing tubes and one of the seed planters to provide air flow between the one wing tube and the seed planter; and
    an air source on the frame to move air through the plurality of hoses, the left and right wing tubes, the left and right bellows, and the center tube to dispense seeds from the plurality of seed planters.

2. The combination of claim 1 wherein the left and right bellows are flexible to permit folding and unfolding of the left and right wing tubes.

3. The combination of claim 1 wherein the center tube, the left and right bellows, and the left and right wing tubes are free from internal pneumatic hoses extending there through.

4. The combination of claim 1 wherein the center tube and the left and right wing tubes each include a collar to which the left and right bellows is secured.

5. The combination of claim 4 wherein the left and right bellows are secured to the collars with hose clamps.

6. The combination of claim 1 wherein the each of the left and right bellows has opposite ends extending into the center tube and the respective left and right wing tubes.

7. A pneumatic system for a folding toolbar and seed planter assembly having multiple seed planters, the folding toolbar having a center tube and opposite left and right outer tubes pivotally connected to the center tube respectively for movement between field and transport positions, and each seed planter having a pneumatic seed metering device, the pneumatic system comprising:
    an air pump on the folding toolbar;
    left and right couplers extending between the center tube and the left and right outer tubes, respectively;
    each coupler having opposite ends which remain attached to the center tube and to the respective left or right outer tube when the outer tubes move between the field and transport positions;
    a plurality of air hoses extending from the center tube and the left or right outer tubes, with one of the hoses being connected to one of the pneumatic seed metering devices of one of the seed planters; and
    the center tube, the left and right outer tubes, and the left and right couplers forming an air manifold between the air pump and the plurality of air hoses.

8. The pneumatic system of claim 7 wherein the left and right couplers are flexible.

9. The pneumatic system of claim 7 wherein left and right outer tubes included left and right hinges, and the left and right couplers are adjacent the left and right hinges, respectively.

10. The pneumatic system of claim 7 wherein the left and right couplers are bellows.

11. The pneumatic system of claim 7 wherein the left and right couplers extend into the center tube and into the respective outer tube.

12. The pneumatic system of claim 7 wherein the toolbar is free from external pneumatic lines extending along the left and right outer tubes to the air pump.

13. A method of dispensing seeds from seed planters mounted on a folding toolbar, the folding toolbar having a tubular center section and opposite tubular outer wing sections pivotally attached to opposite ends of the tubular center section for folding to a transport position and unfolding to a field position, each seed planter having a pneumatic seed metering device, including a pneumatic line extending from the seed planter to one of the toolbar sections, the method comprising:
    creating air flow through the tubular outer wing sections and the tubular center section using an air source to operate the pneumatic seed metering devices of the seed planters; and
    maintaining an air flow path through the tubular outer wing sections and the center section when the tubular outer wing sections are in the transport and field positions.

14. The method of claim 13 further comprising maintaining the folding toolbar free from external pneumatic lines between the tubular outer wing sections and the air source.

15. The method of claim 13 wherein the air flows through a flexible coupler at a junction of the tubular center section and each tubular outer wing section.

16. The method of claim 15 wherein the coupler is connected at opposite ends to one of the tubular outer wing sections and to the tubular center section throughout pivotal movement of the tubular outer wing sections.

17. The method of claim 13 wherein the air flow is negative pressure.

18. The method of claim 13 wherein the air flow is positive pressure.

\* \* \* \* \*